US008510411B2

(12) United States Patent
Coulson et al.

(10) Patent No.: US 8,510,411 B2
(45) Date of Patent: Aug. 13, 2013

(54) METHOD AND SYSTEM FOR MONITORING AND REDIRECTING HTTP REQUESTS AWAY FROM UNINTENDED WEB SITES

(75) Inventors: Patrick R. Coulson, San Francisco, CA (US); Renn A. Ortenburger, Redwood City, CA (US); Scott A. Kinghorn, Houston, TX (US); Stuart S. Piltch, Falmouth, ME (US)

(73) Assignee: Desvio, Inc., San Francisco, CA (US)

( * ) Notice: Subject to any disclaimer, the term of this patent is extended or adjusted under 35 U.S.C. 154(b) by 106 days.

(21) Appl. No.: 13/101,950

(22) Filed: May 5, 2011

(65) Prior Publication Data

US 2011/0276716 A1 Nov. 10, 2011

Related U.S. Application Data

(60) Provisional application No. 61/332,118, filed on May 6, 2010.

(51) Int. Cl.
G06F 15/16 (2006.01)
(52) U.S. Cl.
USPC .......................................................... 709/217
(58) Field of Classification Search
USPC .......................................................... 709/217
See application file for complete search history.

(56) References Cited

U.S. PATENT DOCUMENTS

| 5,751,961 | A   | * | 5/1998  | Smyk ........................... 709/217 |
| 5,892,919 | A   | * | 4/1999  | Nielsen ........................ 709/228 |
| 5,907,680 | A   | * | 5/1999  | Nielsen ........................ 709/228 |
| 6,092,100 | A   | * | 7/2000  | Berstis et al. ................. 709/203 |
| 6,332,158 | B1  | * | 12/2001 | Risley et al. .................. 709/219 |
| 6,519,626 | B1  | * | 2/2003  | Soderberg et al. ............. 709/203 |
| 6,845,475 | B1  | * | 1/2005  | He .................................. 714/53 |
| 7,039,722 | B1  | * | 5/2006  | Fuisz et al. ................... 709/246 |
| 7,136,932 | B1  | * | 11/2006 | Schneider ..................... 709/245 |
| 7,188,138 | B1  | * | 3/2007  | Schneider ..................... 709/203 |
| 7,194,552 | B1  | * | 3/2007  | Schneider ..................... 709/245 |
| 7,296,019 | B1  | * | 11/2007 | Chandrasekar et al. .......... 1/1 |
| 7,346,605 | B1  | * | 3/2008  | Hepworth et al. ................. 1/1 |
| 7,376,752 | B1  | * | 5/2008  | Chudnovsky et al. ........ 709/245 |
| 7,809,858 | B1  | * | 10/2010 | Brown .......................... 709/245 |
| 7,853,719 | B1  | * | 12/2010 | Cao et al. ..................... 709/245 |
| 7,933,951 | B2  | * | 4/2011  | Sullivan et al. ............... 709/203 |

(Continued)

OTHER PUBLICATIONS

"International Search Report", mailed Aug. 11, 2011, PCT/US11/35477.

(Continued)

Primary Examiner — Alicia Baturay
(74) Attorney, Agent, or Firm — Dergosits & Noah LLP; Todd A. Noah

(57) ABSTRACT

Embodiments are described for a system and method for redirecting Internet traffic away from illegitimate web sites. A redirect process includes a typo identifier engine and a direct navigation engine. The typo identifier engine generates a list of domain names based on common typographical variations of legitimate brand domains, and common direct navigation domains. A web crawler process verifies if the generated domain name are registered. The sites are classified as either legitimate or illegitimate based on a series of defined rules and analysis of parameters, such as site content, registrar identity, and owner. The direct navigation engine compares the user's request with the list of known illegitimate domains found by the typo identifier engine. If a match is found, the system replaces the user requested domain name with a redirected domain name.

17 Claims, 11 Drawing Sheets

(56) References Cited

U.S. PATENT DOCUMENTS

| | | | |
|---|---|---|---|
| 7,966,310 B2* | 6/2011 | Sullivan et al. | 707/709 |
| 8,005,943 B2* | 8/2011 | Zuzga et al. | 709/224 |
| 8,201,081 B2* | 6/2012 | Stroe et al. | 715/234 |
| 8,239,528 B2* | 8/2012 | Zuzga et al. | 709/224 |
| 8,245,304 B1* | 8/2012 | Chen et al. | 726/26 |
| 2002/0103820 A1* | 8/2002 | Cartmell et al. | 707/500 |
| 2003/0014450 A1* | 1/2003 | Hoffman | 707/533 |
| 2003/0110295 A1* | 6/2003 | Suzuki et al. | 709/245 |
| 2004/0003115 A1* | 1/2004 | Mason | 709/245 |
| 2004/0019697 A1* | 1/2004 | Rose | 709/245 |
| 2004/0220903 A1* | 11/2004 | Shah et al. | 707/3 |
| 2005/0066041 A1* | 3/2005 | Chin et al. | 709/228 |
| 2006/0112066 A1* | 5/2006 | Hamzy | 707/1 |
| 2007/0174423 A1* | 7/2007 | Yoshida | 709/217 |
| 2007/0283254 A1* | 12/2007 | Hamzy | 715/533 |
| 2007/0294419 A1 | 12/2007 | Ulevitch | |
| 2008/0016233 A1* | 1/2008 | Schneider | 709/230 |
| 2008/0201413 A1 | 8/2008 | Sullivan et al. | |
| 2008/0250159 A1 | 10/2008 | Wang et al. | |
| 2010/0114959 A1* | 5/2010 | Shirakawa | 707/781 |
| 2010/0228963 A1* | 9/2010 | Kassab et al. | 713/150 |

OTHER PUBLICATIONS

PCT International Search Report and Written Opinion of the International Searching Authority for PCT Application No. PCT/US2011/035477 on mailing date Aug. 11, 2011.

* cited by examiner

METHOD AND SYSTEM FOR MONITORING AND REDIRECTING HTTP REQUESTS AWAY FROM UNINTENDED WEB SITES

CROSS-REFERENCE TO RELATED APPLICATIONS

This application claims priority from U.S. Provisional Patent Application No. 61/332,118, entitled "Desvio Redirection Service" filed on May 6, 2010.

FIELD OF THE INVENTION

One or more implementations relate generally to Internet-based networks, and more specifically to monitoring and redirecting domain name and universal resource locator requests.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Resources on the Internet, such as servers and networked devices are identified by a Uniform Resource Identifier (URI). A Uniform Resource Locator or Universal Resource Locator (URL) is a type of URI that provides a means of locating the resource by describing its primary access mechanism (e.g., its network "location"). A URL is typically the address of a specific web page on the World Wide Web (e.g., http://www.example.com/index.html), and a domain name specifies the name of the web site that hosts web pages (example.com). A domain name may identify one or more IP addresses. The domain name is typically translated into an IP address by a Domain Name System (DNS) resolver.

Specific web pages can be made available under several different URLs through techniques such as URL redirection (or URL forwarding) or domain redirection (domain forwarding). URL redirection is commonly used to address the following issues: error correction or redirects to a primary URL from a similar URL (e.g., erroneous www.exsmple.com requests are sent to www.example.com); moving a site to a new domain; substituting short aliases for long domain names (e.g. bofa.com redirects to bankofamerica.com); or as a ploy in phishing attacks, to confuse the user as to which site they are on in an attempt to collect private information about the user Current techniques used to achieve the redirection include manual redirection, by having the requested URL page return a link in the web page requesting that the user click the link to navigate to the suggested URL; HTTP 3xx status codes (300, 301, 302, 303, and 307), which are configured on the web server that hosts the requested domain or URL (this typically requires administrative access to the web server); server-side scripting, which is commonly used when the web site author does not have administrative access to the web server to configure the HTTP 3xx status code; meta refresh tag, which is accomplished by setting a meta tag value in the header of the web page that is returned to the user and then the web browser performs the redirection; JavaScript redirection, which is similar to a meta refresh tag but is accomplished through the use of JavaScript; and frame redirects, wherein the HTML frame contains the target page. In this case the browser continues to display the requested URL instead of the redirected URL The above methods handle redirection, but do so on a limited scale (i.e., site-by-site and page-by-page) and require that changes and settings be made on the web site or web server that will make the redirection. These rules do not allow for quickly creating or changing the redirection rules on an ongoing basis or provide a means for managing and updating several redirect rules all in one location. In addition, the rules do not allow for user specific redirection customization whereby one user is taken to site A and a different user is taken to site B.

With the proliferation of web sites (between 2005 and 2010 the number of web sites doubled, and was expected to pass two billion in 2010) the methods of URL redirection listed above do not meet the current needs of businesses to manage large sets of redirections that must be constantly reviewed, updated and allow for users specific options that can affect where the redirection takes the end user. In general, current redirection systems identify sites as potentially bad sites (e.g., malware or phishing sites) and then simply block the sites, forcing the user to find and correct his or her own errors.

The rise in direct navigation, in which a user attempts to navigate to a specific web site by typing its domain name directly into a web browser address bar has also led to an increase in cybersquatting activity, which relies on a steady stream of traffic to spurious domains generated by input errors made by users. Cybersquatters profit from this traffic through various monetization schemes, including massive pay-per-click link farms, affiliate fraud, and phishing. Over the past few years, direct navigation has grown in popularity due to brands registering and utilizing specialized web addresses to direct users to focused information online. It has further been adopted as users became more comfortable with browsing the Web and the rapid growth in mobile Internet. With billions of Web requests being made daily, a large percentage of those requests include natural typing mistakes resulting from users' incorrectly striking keys, misspelling domains, dropping letters, etc. Input errors during navigation are exacerbated on mobile devices (e.g., tablets and smartphones) that have small keyboards.

In order to handle this growing problem of web-based navigation, a new method for managing, configuring, and delivering IP address redirections is needed.

What is further needed is a scalable method for creating, managing and performing large numbers of IP address redirections that are being updated on a daily basis. Present known techniques typically do not address user specific customization or the ability to override redirections.

BRIEF SUMMARY

Embodiments are generally directed to information retrieval over a network, and more specifically, to a process for monitoring incoming domain name and/or Uniform Resource Locator (URL) requests, comparing the requested resource to a list of categorized resources, and making a determination as to either proceed to the requested resource or redirect to a different resource based upon a set of parameters.

Automated processes and associated hardware circuitry create redirection rules and include mechanisms for continually evaluating and adjusting the redirection rules and customize the redirection rules on a user-by-user basis. Also included are mechanisms to allow the end-user to override a redirection, and the processing of the redirection itself. This is accomplished without having access to the web server or web site that is to be redirected. Embodiments of the process include creation of the domain name list that will be reviewed for redirection; analysis and classification of each entry in the domain name list; and a redirection engine that monitors domain requests and performs the redirection. Embodiments provide a way to identify domains that infringe on the trademark rights of online brand owners. The process identifies domains that redirect users from their requested domain (i.e. the legitimate online brand) to an alternate domain.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for a URL classification system used in conjunction with an IP request monitoring system for redirecting IP traffic from potentially spurious web sites. Aspects of the one or more embodiments described herein may be implemented on one or more computers executing software instructions. The computers may be networked in a client-server arrangement or similar distributed computer network, and one or more of the networked computers may host web pages that are accessed by one or more client computers through web browser programs.

Figure 1:
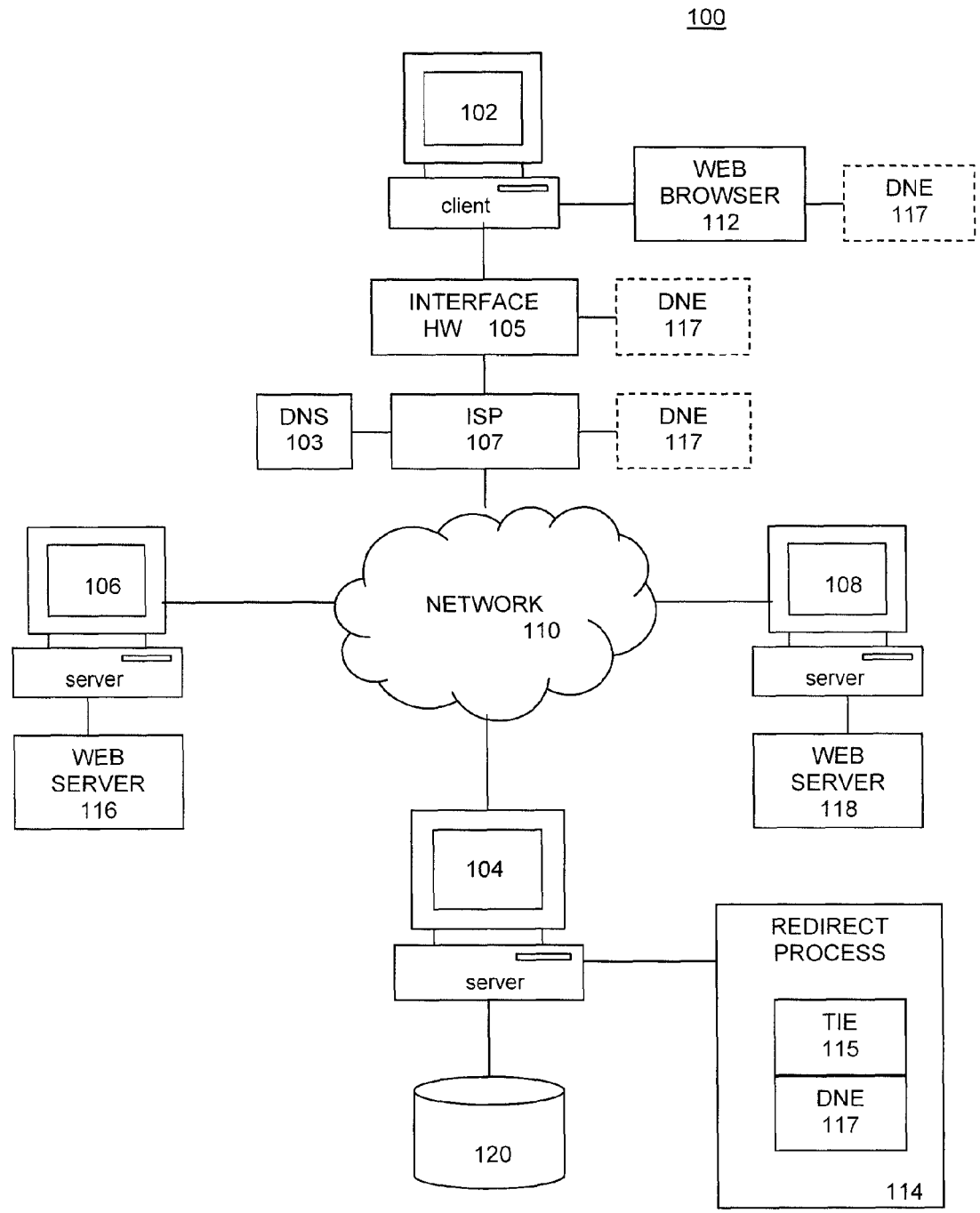
FIG. 1 illustrates a computer network system 100 that implements one or more embodiments of a testing framework for multi-mode applications.

FIG. 1 illustrates a computer network system 100 that implements one or more embodiments. In system 100, a network client computer 102 is coupled to one or more server computers 104, 106, 108 through a network 110. The network interface 105 between client computer 102 and the server computers may include one or more hardware components, such as buffers, routers, switches, proxies and other circuits that function to buffer and route the data transmitted between the server and client computers. Network 110 may be the Internet, a Wide Area Network (WAN), a Local Area Network (LAN), or any combination thereof. For embodiments in which network 110 is the Internet, the client computers may access server computers and other resources on the network through an Internet Service Provider (ISP) 107 that provides account and access resources for the client computer 102.

The client computer 102 of system 100 may be a workstation computer or it may be a computing device such as a workstation, personal computer, notebook computer, personal digital assistant, or the like. The client computer may also be embodied within a portable or wireless access device, such as a smartphone, personal digital assistant (PDA) or similar mobile communication device. Likewise, each of the server computers 104, 106, 108 may be implemented within any suitable networkable computing device, such as server-class computers, workstations, personal computers, or any similar device capable of hosting applications accessed over network 110.

In a typical implementation, one or more of the server computers may be a World-Wide Web (WWW) server that stores data in the form of web pages and transmits these pages as Hypertext Markup Language (HTML) files over the Internet 110 to client computer 102. For the embodiment of FIG. 3 in which network 110 is the Internet, network servers 106 and 108 each execute a respective web server process 116 and 118 to provide HTML documents, typically in the form of web pages, to client computers coupled to the network. To access the HTML files provided by a web server process, client computer 102 executes a web browser process 112 to access web pages available on server 103 and other Internet server sites, such as other content providers. In this case, a user of client 102 makes an HTTP request that specifies the network address of the target server computer (e.g., server 103). A network address specifies the location of a requested resource in the network, and may comprise a domain name or URL of a web site or web pages served by the web server process. A valid HTTP request to the proper server results in the desired web page being served back to the client computer for display through the web browser process 112.

For the embodiment of FIG. 1, system 100 includes a redirection server 104 that executes a redirect process 114. The redirect process 114 monitors incoming HTTP (domain name and/or URL) requests from the client computer 102, compares the requested resource to a list of categorized resources, and makes a determination as to either proceed to the requested resource (e.g., server 103) or redirect to a different resource based upon a set of parameters. The parameters and other relevant process rules may be stored in a data store 120 closely or loosely coupled to redirection server 104. For example, the client may request a web page served by server 106 by typing a URL directly into the navigation input area of web browser 112. Due to either a typographical error or actions taken by certain content providers, the input request may actually result in the user navigating to server 108 instead. In this case the target site on server 106 is not reached because the client 102 is directed to server 108. The redirect process 114 evaluates the request and determines whether or not the request should processed normally by the ISP 107 to allow navigation to erroneous server 108, or whether the request should be redirected to the actual target server 106. The ISP 107 also executes a domain name system (DNS) process 103 that maps names to appropriate IP addresses.

In an embodiment, the redirect process 112 may include several subcomponents or processes, such as a typo identifier engine (TIE) 115 and a direct navigation engine (DNE) 117. The typo identifier engine 115 operates generally to generate a list of domain names based on common typographical variations of legitimate brand domains, and common direct navigation domains. In general, the redirect process 112 creates a list of domain names that will be evaluated for use in redirection rules. This list is automatically generated based upon a set of input parameters. These parameters include, but are not limited to: (1) a seed list of domain names; (2) one or more attributes for the organization that owns the associated domain from the seed list; and (3) one or more key words that are associated to each domain from the seed list. These input values are used to generate an output list that includes variations of the seed list of domains. The output list comprises a super list of domain names that includes virtually all relevant variations of the original domain names in the seed list. This output list is also called a "redirection list" that lists the domains, URLs or other network address identifiers that input traffic will be redirected to by the DNE. The redirection list, along with the original seed list, may be stored in appropriate databases within data store 120. Regardless of actual physical storage location the redirection list can be considered to be housed within the redirect process 114 for use by the DNE 117. The DNE 117 evaluates the resource requested by the client and compares the requested address against the redirection list to determine whether or not the request should be processed as normal or redirected to a different server computer, e.g., server 106 instead of server 108.

With respect to actual implementation, it should be noted that the DNE component may be implemented in one of several ways. As shown in system 100, the DNE may be a component within the redirect process 114 executed by a server 104 that is separate from any of the content provider servers 106 and 108 and from the client 102. Alternatively, the DNE may be executed by the client 102 directly as an application or operating system process. As shown in FIG. 1, it may also be embedded in the web browser 112 or provided as a plug-in program for execution by web browser 112. The DNE can also be provided as part of the network interface hardware 105. The DNE function may also be implemented as a function executed by the ISP 107.

The system 100 of FIG. 1 is generally configured to create a set of network resources (e.g., web sites or web pages) by starting with a seed list and generating variations to make a super list of resources, analyzing the network address included in an HTTP request input by a user through a web browser, and compare the requested address with entries in the super list to determine the appropriate network site to direct the request. The DNE functions to redirect user requests from an original requested domain to a different suggested domain. In an embodiment, the DNE is implemented within the ISP and in-line with its traffic and processes incoming requests before the DNS resolution. The DNE evaluates the input request and performs any required redirection before any DNS resolution takes place. This allows user requests to be routed around a requested domain before the original destination server has received the request. This provides significant advantages over present known methods in which address forwarding does not occur until after the original target server has received the request.

Figure 2:
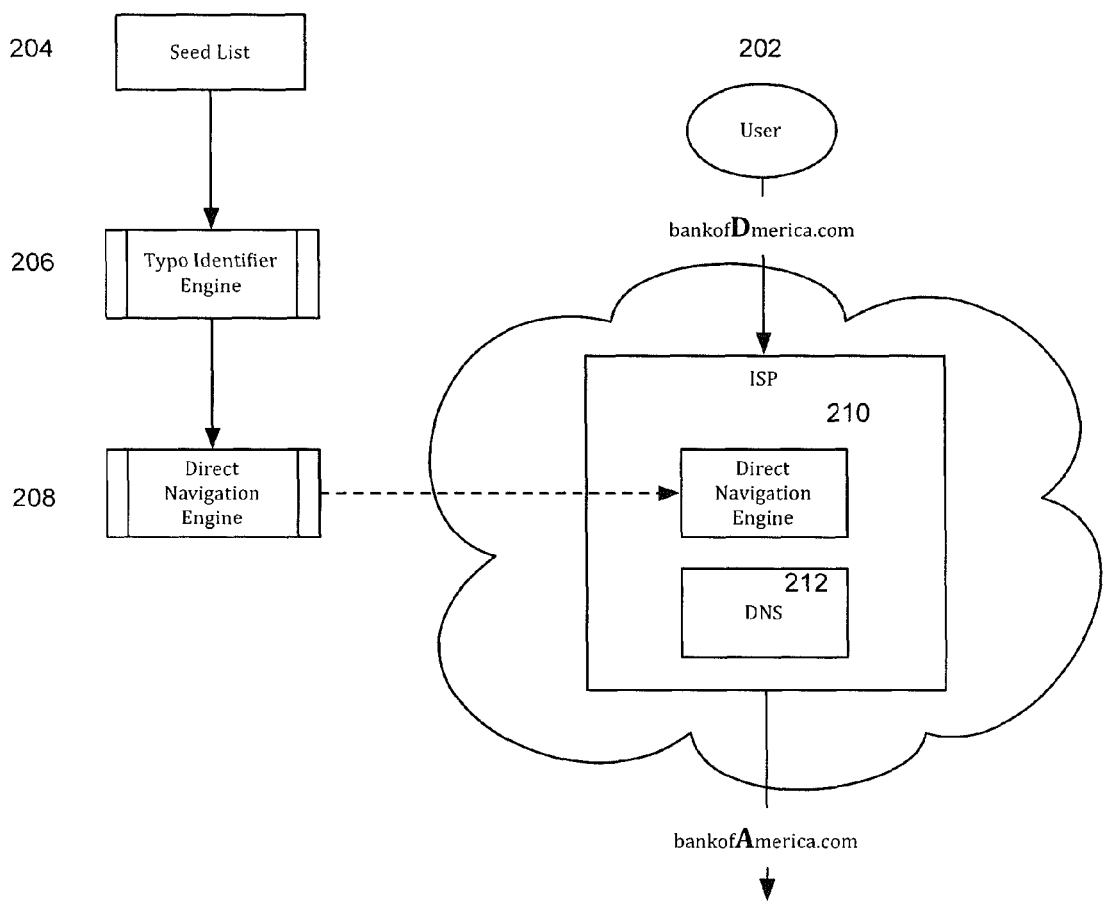
FIG. 2 is a block diagram illustrating a URL/Domain redirection system, under an embodiment.

FIG. 2 is a block diagram of a URL/Domain redirection system, under an embodiment. As illustrated in FIG. 2, the main components of the redirection system comprise a seed list 204, a type identifier engine 206, and a direct navigation engine 208. These components may be installed and executed on a dedicated server computer 104. Alternatively, one or more of the components, such as the direct navigation engine 208 may be provided by one or more of the other resources in the system, such as client 102, web browser 112, interface hardware 105, or ISP 107.

Figure 3:
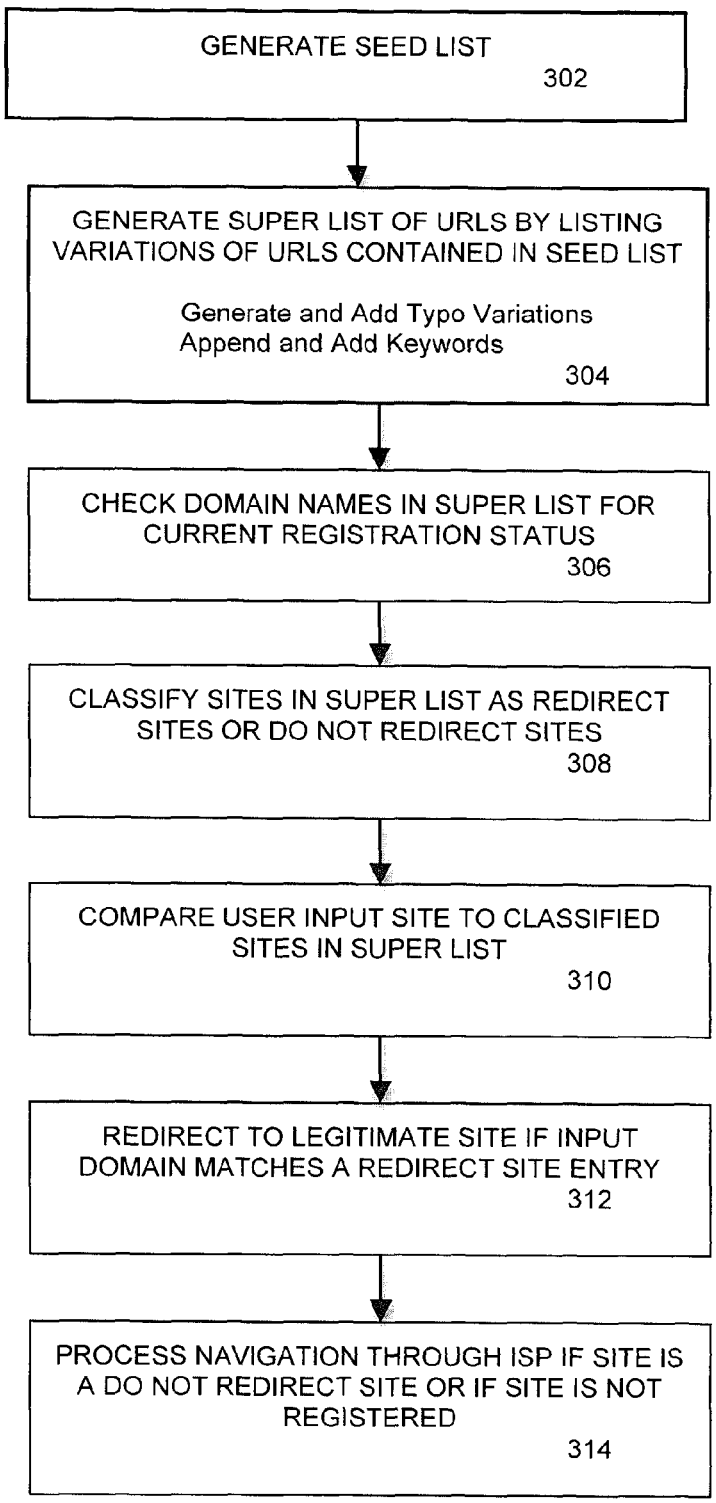
FIG. 3 is a flowchart illustrating a method of performing URL/Domain redirection, under an embodiment.

FIG. 2 illustrates how the redirect process 112 accepts an HTTP or DNS request as input, processes the input domain name or URL, and redirects to a different domain name, if necessary. As shown in FIG. 2, user 202 of a client computer (e.g., client 102) enters a URL into the web browser 112. The input URL of this example is misspelled as www.bankofdmerica.com. The domain name www.bankofamerica.com is included in the seed list 204, and the typo identifier engine 206 has generated a list of variations of this domain name, including various misspellings, such as "bankofdmerica.com." The input URL is processed by ISP 210 and the direct navigation engine 208 compares the input URL to the list of invalid domains generated by the type identifier engine 206. In this example, the direct navigation engine finds that the input "bankofdmerica" should be "bankofamerica" instead, and redirects the request to www.bankofamerica.com. This redirected request is then processed DNS process 212 within ISP 210 to access the domain server for bankofamerica.com FIG. 3 is a flowchart illustrating a method of performing URL/Domain redirection with reference to the system of FIG. 2, under an embodiment. The process begins with the definition of the seed list, block 302. The seed list is typically stored in data store 120, which is associated with redirection server 104. In an embodiment, the seed list is populated by a process of taking a number of top properties on the Internet consisting of name brands, known domain names, and/or known trademarks. For example, a seed list may comprise the top 2,000 (or similar number) of web properties on the Internet. The seed list typically consists of domain name or URL addresses for top-ranking web sites. Thus, the seed list may represent the most common target sites for a given region at a give time roughly based on search engine statistics or other measures of web traffic.

The seed list is used to generate a super list or redirection list based on spelling variations and compound words based on the seed list of domains and addresses, block 304. The super list is created by generating and adding spelling variations for each of these entries, as well as appending certain strategic keywords to each of these entries and adding them to the list. Thus, if an entry in the seed list is www.example.com, the added variations include www.exmple.com, www.xmpl.com, www.examplestore.com, and so on. In this manner, an initial seed list containing thousands of domain names can be used to generate a super list that contains upwards of hundreds of thousands of domain names. This process thus creates many URLs around legitimate websites.

As shown in FIG. 2 and FIG. 3, the typo identifier engine uses the seed list 204 to generate variations of URL and domain names to create a redirection list of variations of the seed list entries for use by the direct navigation engine to compare against the input DNS or HTTP requests. The processing to create this redirection list utilizes a number of different methods. A first method generates typographical variations of the seed list of domains. These include: phonetic misspellings, misspellings based upon letter transposition, misspellings based upon dropped letters, misspellings based upon duplicated letters, misspellings based upon keyboard proximity, and misspellings based on dropped '.' from the domain name. A second method utilizes combinations of the seed domains with their associated attributes, such as business locations and industry (e.g. acmeatlanta.com or acme-clothing.com), combinations of the seed domains with their associated key words (e.g. acmeshoes.com), typographical variations of the seed domains with their associated attributes and key words, and manual addition of specific domain names.

The process then checks these generated URLs of the super list against Internet registration lists to determine whether or not they are registered web sites, block 306. For sites that are determined to be registered, an artificial intelligence engine then evaluates the websites to determine whether the site is a legitimate site or one that is established to exploit a company or user, infringe a trademark, or other spurious purpose, such as phishing, distributing malware, and so on. This creates a map of good versus bad domains. In an embodiment, the redirect process 112 includes webcrawler processes that crawl the registered sites to classify the sites based on certain defined parameters, such as content and registration entity, owner, and other similar parameters. The classifier process includes a set of rules that are used to perform the classification. These rules determined who is the registrar, who the site is owned by, and the actual content of the site. With regard to content, the process determines whether the content is mostly or purely displayed ad messages, requests for user information, or malware distribution. These factors tend to indicate that the site is established for illegitimate or spurious purposes. The classification thus generally defines a site as a legitimate site or an illegitimate site. The redirect process characterizes illegitimate sites as sites to be redirected from (redirect), and legitimate sites as sites not to be redirected from (do not redirect), as shown in block 308 of FIG. 3. If a site is classified illegitimate, it may be further sub-classified based on the type of spurious site it is, such as a phishing site, malware site, pay per click site, affiliate fraud site, and so on.

In an embodiment, the user HTTP or DNS request is passed by the redirection engine for processing by the ISP. The ISP handles the DNS processing, as usual, which is then analyzed by the system to determine if the address is to a legitimate site or an illegitimate site. As shown in block 310 of FIG. 3, the process compares the user input site to the classified sites in the super list. If the requested URL is a registered site that has been classified as a legitimate site, the user is navigated to that site through normal ISP processing, block 314. If, however, the requested URL is a registered site that has been classified as an illegitimate site, the user is redirected to the site that the system believes the user intended to navigate to, block 312. Thus, attempted navigation to an illegitimate classified site will result in redirection to the potentially correct site, instead of simple blocking of the illegitimate site.

In the case where the requested URL is not registered, as determined in block 306, the user request will be processed as usual by the ISP. This typically results in the return of a "server not found" type error page, or other search page, depending upon the practice of the ISP. For example, a registered site without a valid html page would return a "page not found error."

In general, the process of FIG. 3 acts to automatically monitor and correct direct navigation performed by the user through a web browser. As the user types in a request, the system catches the request in the ISP. If the request is to a potentially bad domain, the system responds by redirecting the browser to the domain that the system thinks the user actually wants to navigate to. The redirection system delivers a scale of redirection by taking an input list of thousands of domains from the seed list and generating upwards of millions of variation domains (the super list).

Figure 4:
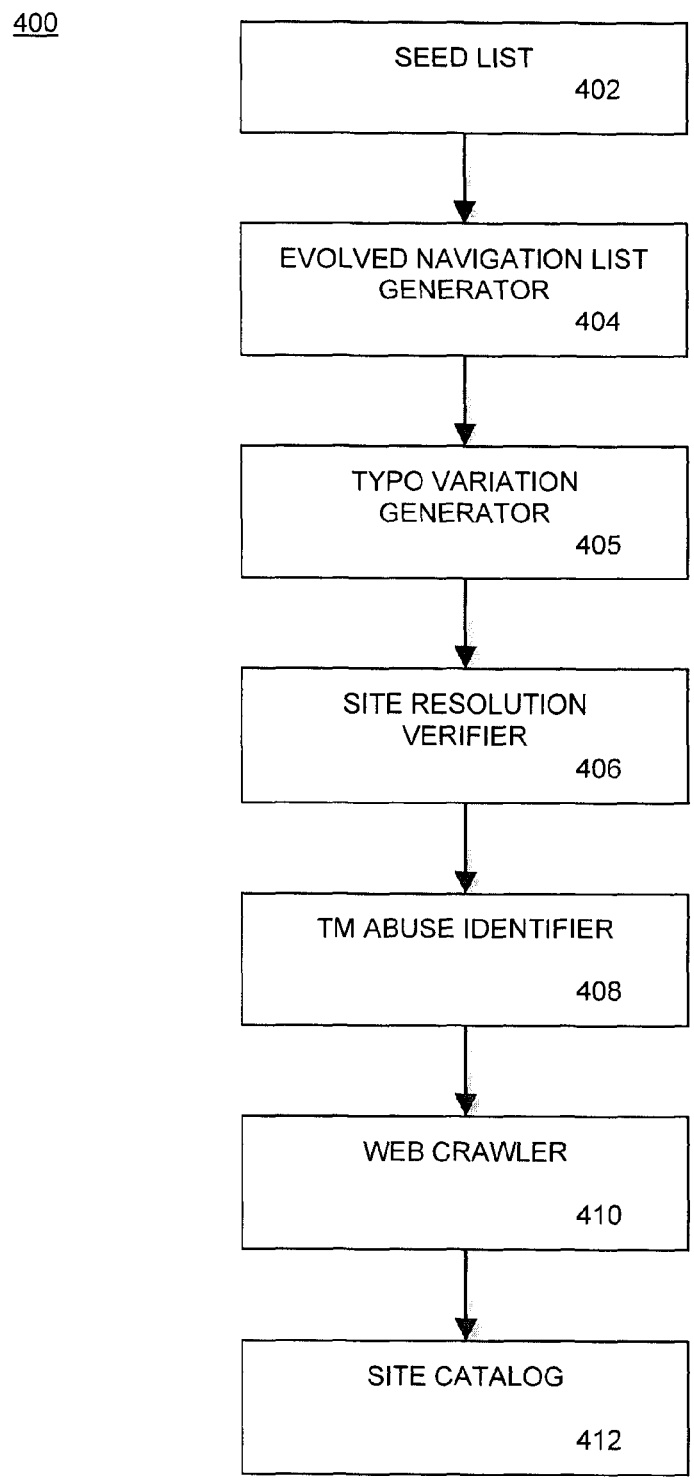
FIG. 4 is a diagram illustrating the components of a typo identifier engine, under an embodiment.

As shown in FIG. 1, the redirection process 112 includes a typo identifier engine 115 that uses a seed list to generate a list of domain names based on common type variations of legitimate brand domains and common direction navigation domains. FIG. 4 is a block diagram illustrating the components of a typo identifier engine, under an embodiment. As shown in FIG. 4, the original seed list 402 is processed by an evolved navigation list generator 404 and a typo variation generator 405 to create the super list. The typo variation generator 405 dynamically generates typographical variations of the seed list entries through a set of algorithms that perform certain typing functions, such as swapping characters within an domain name, dropping characters, adding characters, and so on. The evolved navigation list generator 404 generates evolve-nay URLs, which consist of the seed word plus one or more key words. The key words for a specific entry may be determined through a reverse lookup for most popular key word searches on the brand corresponding to the seed list entry.

The direct navigation engine 117 compares a user's request with the list of known illegitimate domains found by the typo identifier engine. If a match is found, the system replaces the user requested domain name with a new domain name. The process then verifies whether or not the domain name to be redirected to resolves. A site resolution verification component 408 performs this task. If the domain name resolves, the typo identifier engine performs a series of checks to verify if the target website is legitimate, or if it is an illegitimate site, such as a typosquatted site, pay-per-click site, affiliate fraud site, phishing or diversion site, or any other similar type of web site. This is performed by a trademark abuse identifier process 408. A web crawler process 410 is then used to store the content of the redirected to web page at the time of the crawl in a site catalog 412.

Figure 5:
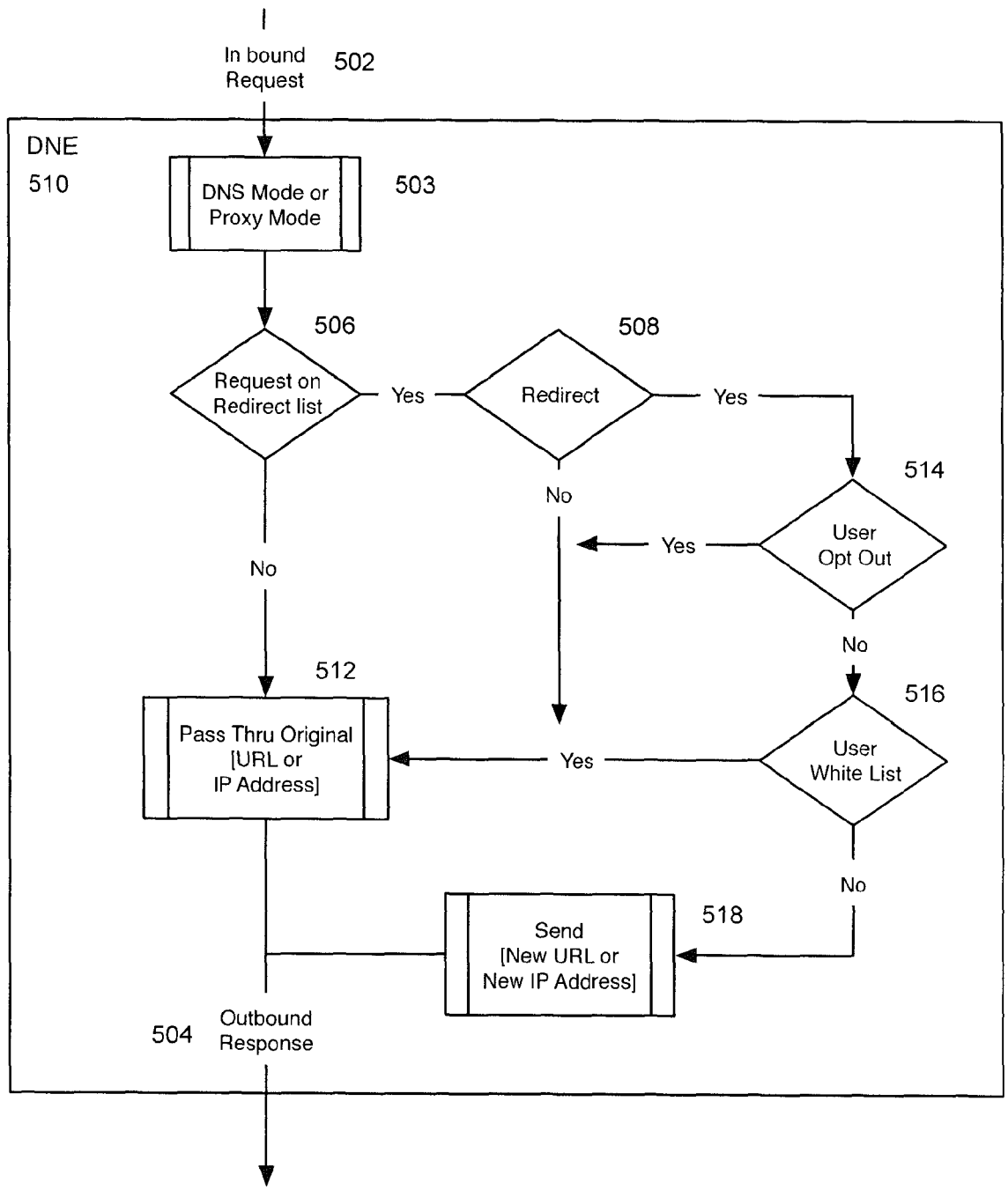
FIG. 5 is a block diagram illustrating the components of a direct navigation engine, under an embodiment.

With reference to FIG. 1, the redirect process 114 includes a direct navigation engine 117. The direct navigation engine 117 compares the user's input URL request with the list of known illegitimate domains found by the typo identifier engine 115. If a match if found, the system replaces the user's requested domain name with a new domain name. FIG. 5 is a diagram illustrating the components and processes of a direct navigation engine, under an embodiment. As shown in FIG. 5, an inbound request 502 from the user is processed by DNE 510 to generate an outbound response 504. A first processing component 503 verifies that the request is a DNS mode or proxy mode request. The DNE then verifies whether or not the network address within the request is on the redirection list generated by the TIE 115, block 506. If it is not on the redirection list, the address (URL or IP address) in the request is passed through to generate the outbound response 504. If, in block 506 it is determined that the request is on the redirection list, it is further determined whether or not a redirect is to be performed, block 508. If the address in the request is on the redirection list, but not redirection is to occur, the address (URL or IP address) in the request is passed through to generate the outbound response 504. If, however, in block 508 it is determined that a redirection is to occur, the process next determines whether or not the user has elected to opt-out of the redirection, block 514. If the user has opted out, the address in the request is passed through to generate the outbound response 504. If the user has not opted out, the process next determines whether or not the requested resource is on a user white list, block 516. A white list is a user specified list of domains that are not to be redirected. If the resource is on the user while list, the address in the request is passed through to generate the outbound response 504. If the resource is not on the user white list the process sends the new URL or IP address to redirect the original request. This substituted address is then incorporated in the outbound response 504.

When a user inputs a request, the web browser sends a domain for which the ISP provides an IP address. In an embodiment, the inbound request address may be URL-based or it may be DNS-based. A URL-based redirection system is inline with all requests and analyzes virtually all of the traffic that passes through the DNE 510, but allows redirection to specific web pages or very specific locations. The URL-based DNE acts as a proxy server, thus as shown in FIG. 5, block 504 determines whether the system has been set to operate in DNS mode or in URL mode (Proxy mode). The redirect process can be configured to watch requests as they go into the ISP or come out of the ISP, and for either DNS requests or URL requests. In general, the ISP that installs or utilizes the redirect process will select which of these options to implement.

Figure 6:
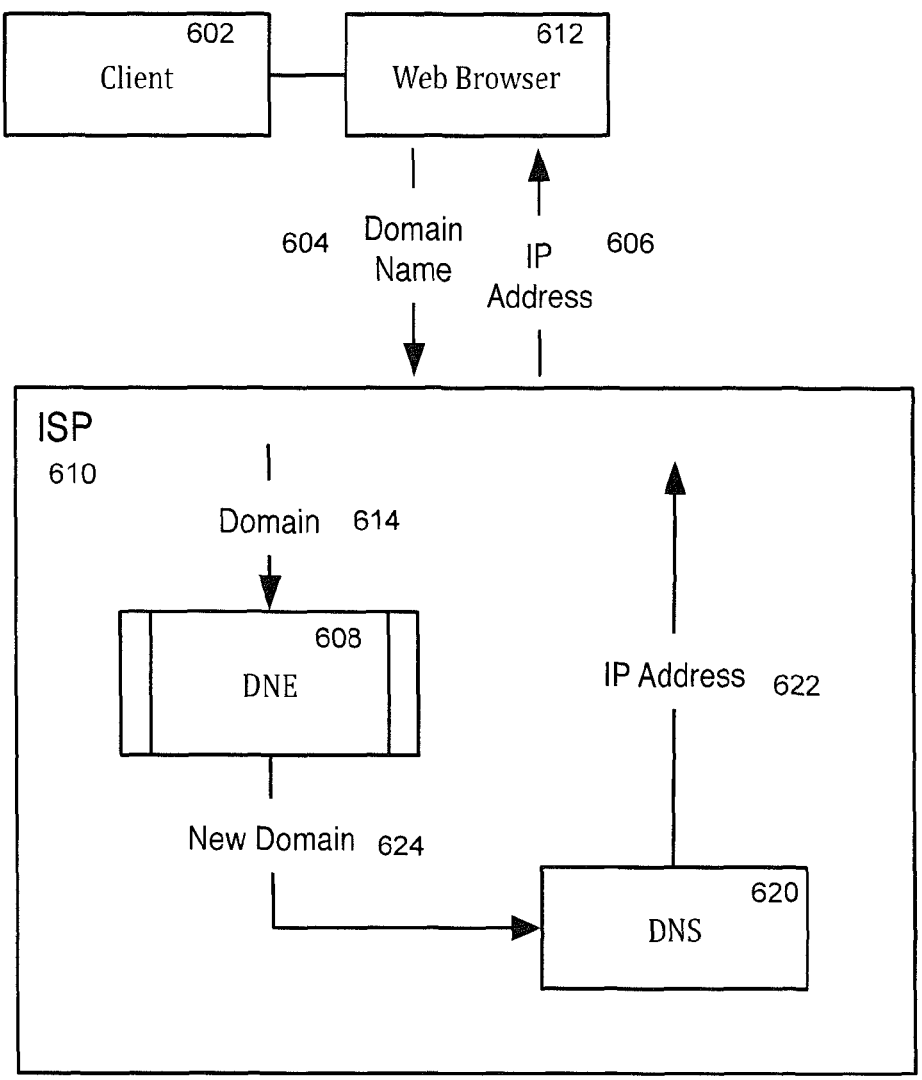
FIG. 6 is a diagram illustrating performing a redirect operation before DNS resolution, under an embodiment.

FIG. 6 is a diagram illustrating a domain redirect system performing a redirect operation before DNS resolution, under an embodiment. As shown in system 600, the web browser process 612 executed by client computer 602 transmits a domain name 604 upon an input request by the user. The request is sent to ISP 610 to generate the appropriate IP address for the requested domain 614. Within the ISP, the domain 614 is analyzed and processed by DNE 608. If the request is to be redirected to a domain that is different than the requested domain name 604, a new domain 624 is substituted in for the original domain 614. The new domain 624 is then processed by the DNS process 620, which transmits the IP address 622 for the new domain. This is then transmitted back to the web browser 612 as IP address 606.

Figure 7:
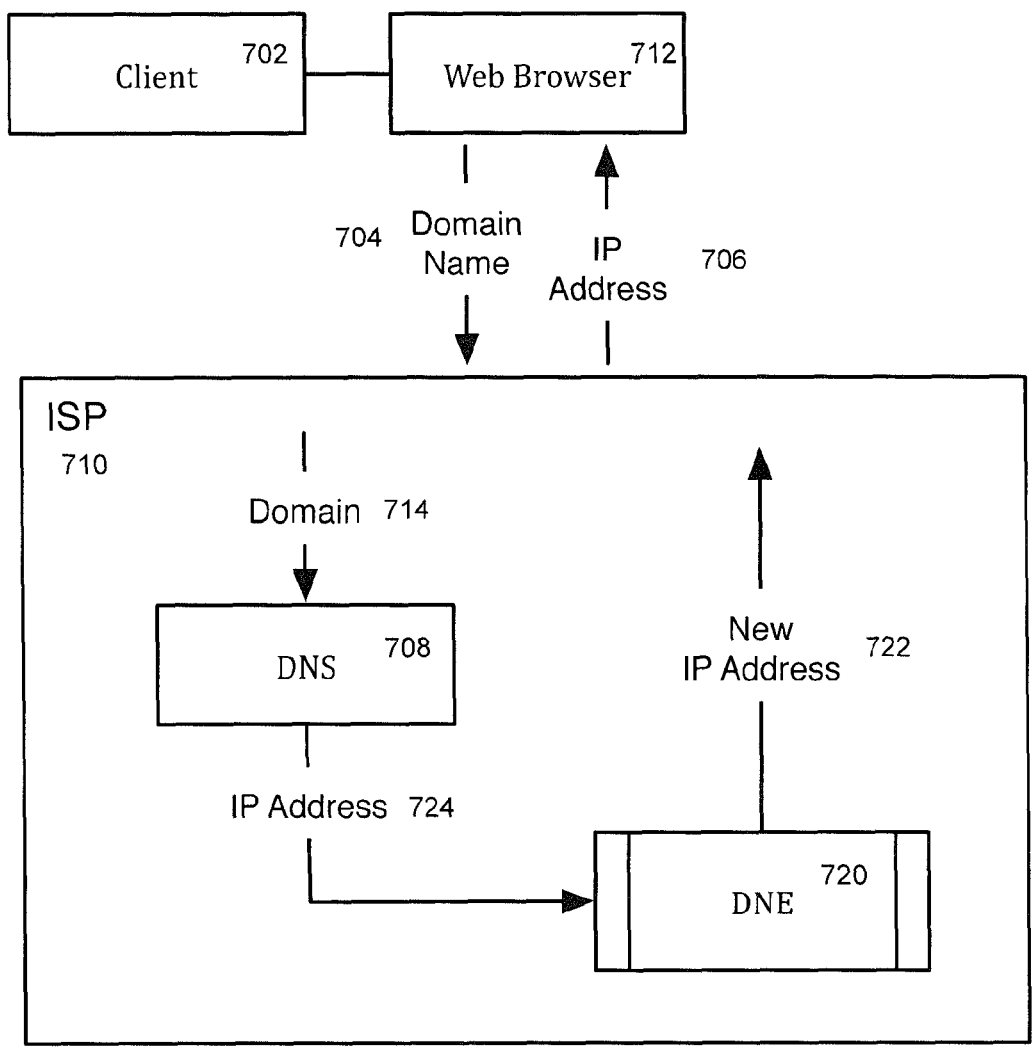
FIG. 7 is a diagram illustrating performing a redirect operation after DNS resolution, under an embodiment.

In an alternative embodiment, the redirect operation can be performed after DNS resolution of the domain request, as opposed to before DNS resolution. FIG. 7 is a diagram illustrating performing a redirect operation after DNS resolution, under an embodiment. As shown in system 700, the web browser process 712 executed by client computer 702 transmits a domain name 704 upon an input request by the user. The request is sent to ISP 710 to generate the appropriate IP address for the requested domain 714. The domain 714 is processed by DNS process 708, which resolves the domain to the appropriate IP address 724. The IP address 724 is then analyzed and processed by DNE 720. If the request is to be redirected to a domain that is different than the requested domain name 704, a new domain the new IP address 722 is substituted in for IP address 724 of the original domain 714. This new IP address 722 is then transmitted back to the web browser 712 as IP address 706.

Figure 8:
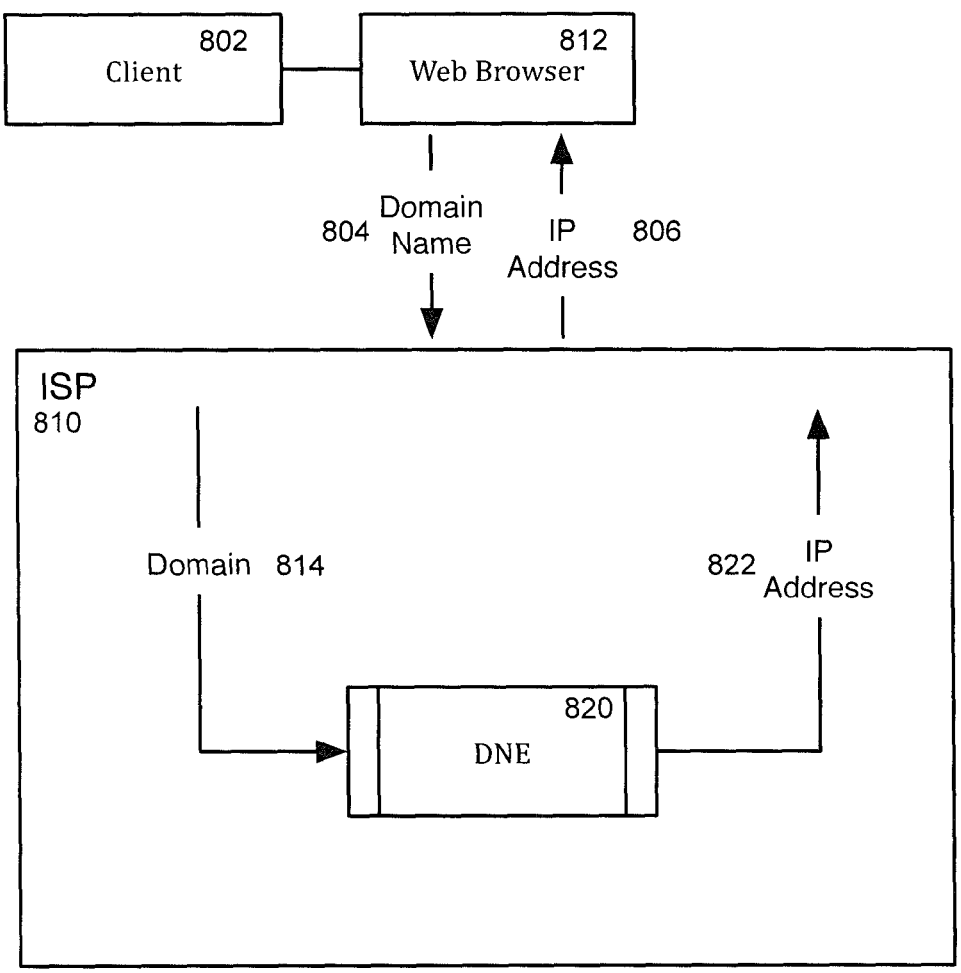
FIG. 8 is a diagram illustrating a direct navigation engine providing DNS services, under an embodiment.

In a further alternative embodiment, the DNE may be configured to provide DNS resolution itself. FIG. 8 is a diagram illustrating a direct navigation engine providing DNS services, under an embodiment. As shown in system 800, the web browser process 812 executed by client computer 802 transmits a domain name 804 upon an input request by the user. The request is sent to ISP 810 to generate the appropriate IP address for the requested domain 814. Within the ISP, a DNE component 820 provides both DNS resolution and redirection services. The domain 814 is analyzed and processed by DNE 820. If the request is to be redirected to a domain that is different than the requested domain name 804, the DNE 820 performs the redirection and directly provides the IP address 822 for the new domain. This is then transmitted back to the web browser 812 as IP address 806.

Figure 9:
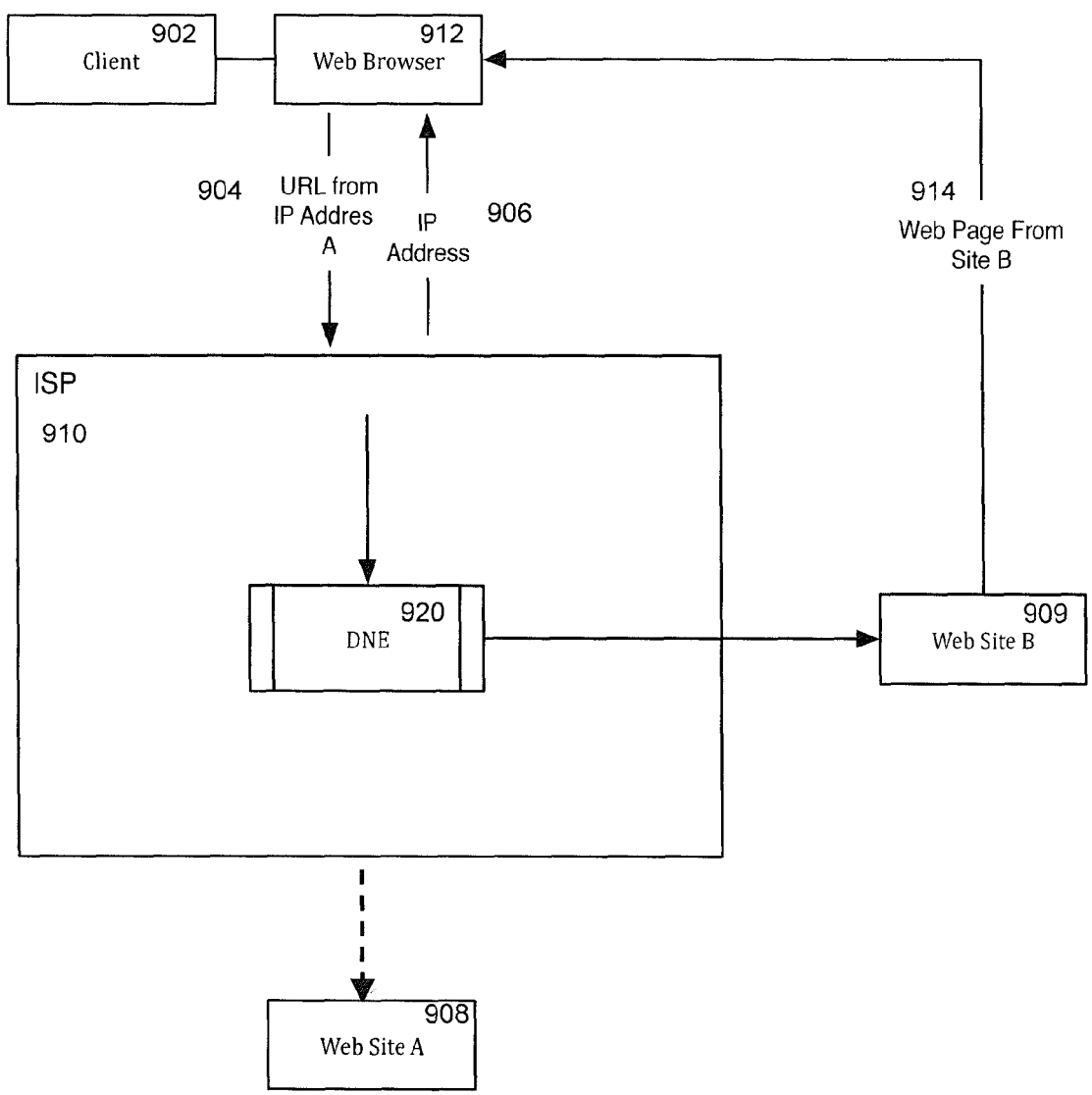
FIG. 9 is a diagram illustrating a direct navigation engine performing as an inline web proxy providing redirection services, under an embodiment.

In a further alternative embodiment, the combined DNE/DNS component can also be configured to act as an inline web proxy to serve redirected web pages back to the client. FIG. 9 is a diagram illustrating a direct navigation engine performing as an inline web proxy providing redirection services, under an embodiment. As shown in system 900, the web browser process 912 executed by client computer 902 transmits a URL for a first web site, web site A, 908. This is transmitted as the URL from IP Address a 904. The request is sent to ISP 910 to generate the appropriate IP address for the requested URL. Within the ISP, the URL 614 is analyzed and processed by DNE 920. If the request is to be redirected to a different web site, web site B 909, the IP address for the new web site 909 is substituted in for the web site 908 IP address. The web page 914 from web site B 909 is then served back to the web browser 912.

The system of FIG. 5 illustrates a redirection system evaluates a domain within an inbound request 502, categorizes or classifies the domain, and performs a redirection based on a comparison of the categorized domain with a redirection list. In an embodiment, each domain that is generated from the automated domain list is reviewed by the direct navigation engine to collect attributes that are used in the categorization of the given domain. This includes, but is not limited to: automated collection of domain registration information; automated collection of the web page source code and screen shot for each home page in the domain list; and an automated following of random HTTP links off of the domain home page and collection of the web page source code for the respective web pages. These attributes, along with their historical values from any previous analysis, are then provided as inputs to a domain categorization algorithm. This algorithm categorizes each domain into one of two main classifications or categories, namely: Redirect (illegitimate site), or Do Not Redirect (legitimate site). Each of these two main categories may have customizable sub categories that to which each domain can be associated. For example illegitimate sites may be further classified as pay-per-click, diversion, malware, phishing, gripe, adult, and so on.

Along with the categorization of the domain, a confidence level is associated to that classification. Each domain can be associated to one or more domains that it will be redirected to. The determination of which domain to use is based upon information provided at the time of the request and includes, but is not limited to: the unique user is that is making the request, date and time of the request, location of the user making the request, user preference for the requested domain, and user preference for use of the service.

The direct navigation engine can be configured to work on a training set of data, which is a test set of data plus a confidence level. This constitutes a learning system that includes a training engine. Different rules can be defined for classification purposes. For example, with regard to classifying a site as an illegitimate typosquatting site, a bad site may be defined as one that has at least 90% of is contents as ad links. In this case, if the original request specified this bad site, the redirect process would redirect the user request to a different site based on a spelling variation of the bad site.

The redirection service can be delivered in the following ways. One delivery method is directly requesting the service from the client's system (any computing system that has a user interface including a web browser). The operating system can direct all browser-based request to a redirection process. Alternatively, the web browser directs all browser-based requests to a redirection process. Another method is that a web browser plugin directs all browser-based requests to a redirection process. Yet another method is that the client's proxy server directs all browser-based requests to a redirection process.

The service can also be requested from the local network. In this case, a local proxy server can direct all browser-based requests to a redirection process. Alternatively, the service can be delivered via an Internet Service Provider (ISP). The redirection can occur before the request reaches the ISP's DNS via a redirection process; or redirection can occur after the request reaches the ISP's via a redirection process, as shown in FIGS. 6-9.

In an embodiment, the redirection process includes an administrative user interface allows for reviewing the list of domain names, their classification information, confidence level, and allows for manually specifying a main and subclassification.

Figure 10:
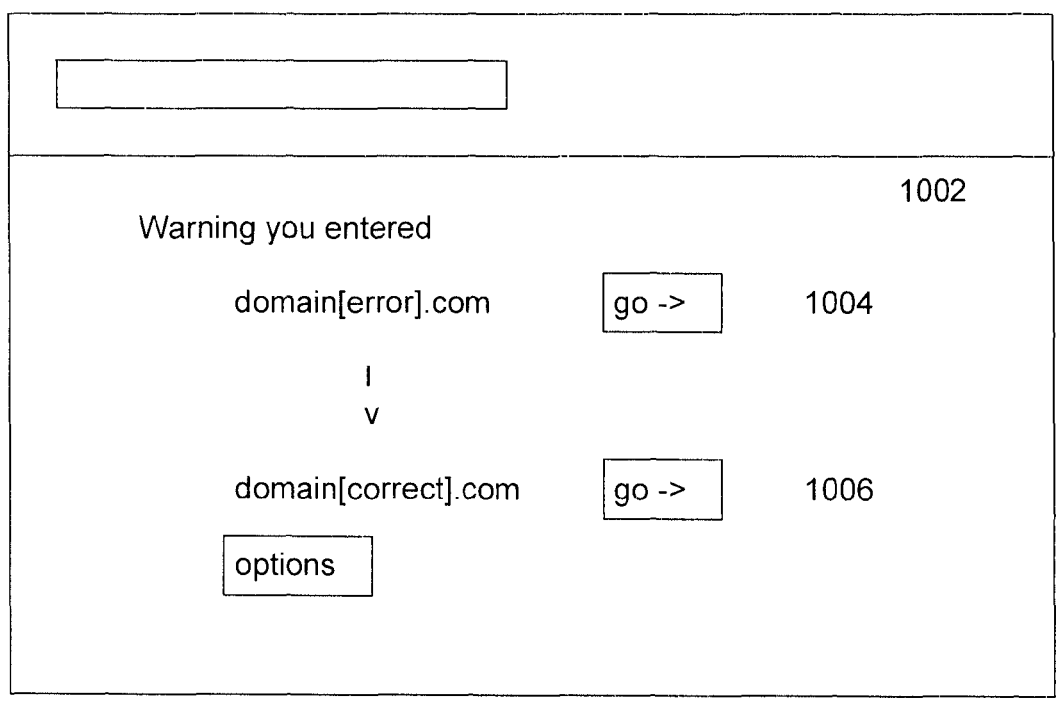
FIG. 10 is an example graphical user interface (GUI) page illustrating the notification of a redirect to a user by the redirect process.

The user can opt-in or out of the redirections service. When a redirection occurs the user will be notified. The notification is viewable within the user's interne browser and allows the user to perform the following actions: (1) request that they be sent to the originally requested URL; request to view additional details about the originally requested URL; request to whitelist the originally requested URL so that future requests are not redirected; and request to opt out of the redirection service so that all future requests are not redirected. FIG. 10 is an example graphical user interface (GUI) page illustrating the notification of a redirect to a user by the redirect process. The web page includes a main display area 1002 that includes a warning message indicating that the DNE is ready to perform a redirect operation away from the originally requested domain. The original and possibly erroneous domain 1004 is listed along with a command button that allows the user to continue to navigate to that domain, if he or she so chooses. The domain that the redirect process considers the correct domain 1006 is also listed along with a command button that allows the user to confirm the redirections. An options button provides access to other functions of the redirect process, such as listing alternative correct domains if other domains are eligible.

Figure 11:
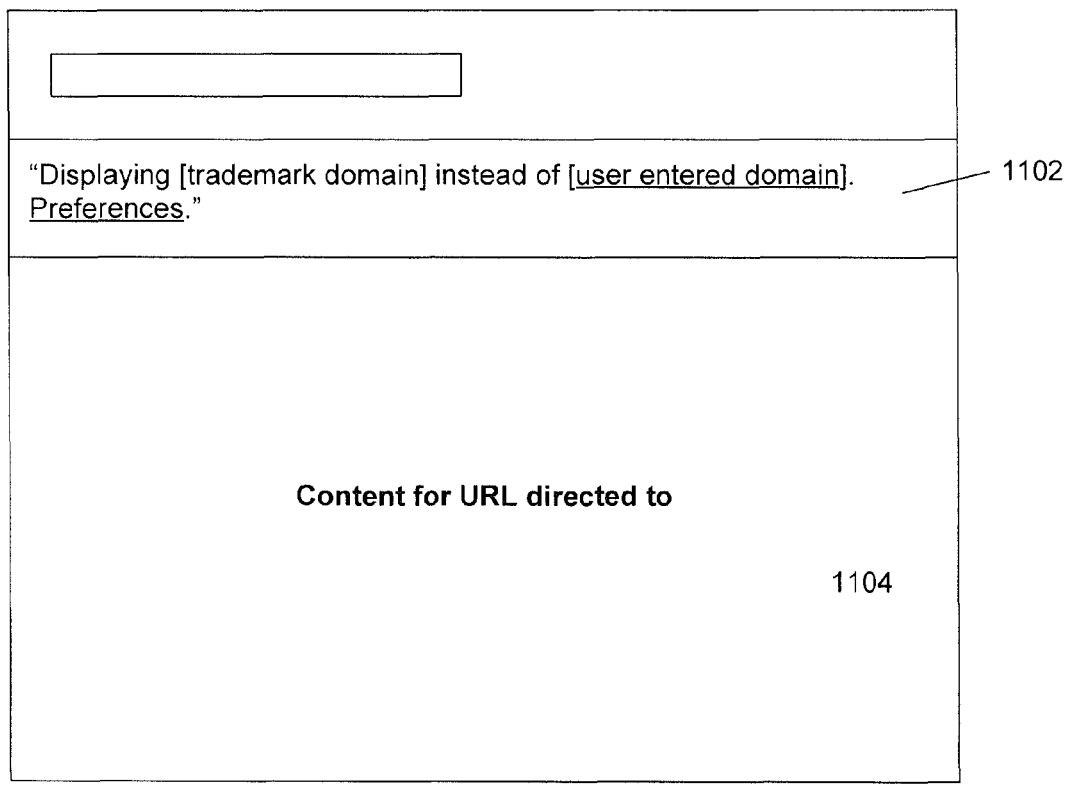
FIG. 11 is an example GUI page illustrating the contents of a redirected site to a user.

The redirect process may be configured to alert the user and provide a choice of manually overriding the redirect, as shown in FIG. 10. In certain cases, the redirect process may be configured to redirect automatically without providing a mechanism for user input. FIG. 11 is an example GUI page illustrating the contents of a redirected site to a user. As shown in FIG. 11, the display area includes a notification 1102 that the browser is displaying the contents of a different site as opposed to the contents of the site corresponding to the user entered domain. The actual web page can be displayed in a main display area 1104.

In general, the direct navigation engine differs from traditional domain forwarding in that the redirection happens before the DNS resolution takes place, although redirection can also be configured to happen after DNS resolution takes place. With traditional domain forwarding, the forwarding does not occur until the original destination server has received the request. It also differs from domain blocking in that the user is not just shown a page stating their request was blocked. As stated before, with the direct navigation engine users can be routed around their requested domain before the original destination server has received the request, regardless of whether the site has implemented traditional domain forwarding or not. The method for intercepting a users domain request includes evaluating it against a known list of sites, finding a match, and returning a different page than was initially requested. If a match is not found, the system passes the original request through to the DNS. This method can occur at any point between a user's domain request and its resolution within the DNS. In an embodiment, the DNE is implemented as a server process that sits within an ISP, in-line with its traffic, before the DNS process. As shown in FIG. 1, however, other implementations are possible. For example, the direct navigation engine can be implemented as hardware or software within the infrastructure of an ISP, or hosted in a datacenter, or at various other points, such as within web browser, in a system hosts file, in a proxy server, in router hardware, in a DNS server, and in a client computer.

In an embodiment, there are six possible outcomes from the direct navigation engine. The first is that the redirection happens silently (i.e. the redirection is forced and a user does not know it occurred). The second is that the redirection is ignored based on a user's preference settings (i.e. a user has opted out of the service or "white-listed" the requested domain in question). The third is that the redirection happens silently based on a user's preference settings. The fourth is that the redirection occurs and a user is notified that they have arrived at a different page than requested. The fifth is that an interstitial page is returned where a user must choose between the typed in domain and the alternate domain. The sixth is that no match is found and the original URL request proceeds as normal to the target site.

The redirection process is intended to provide broad and far-reaching protection for users of the Internet. For example, it can be used to protect brands and end users from typosquatting sites, phishing sites, and affiliate fraud sites by redirecting users to their intended destination. The classification of domains can be extended beyond typographical variations. Domains can be classified on the basis of various other characteristics or parameters. The domains are analyzed based on the selected parameter and an appropriate redirection list is compiled. Input requests are then analyzed with respect to the redirection list to determine whether or not the request should be redirected to an alternate site. For example, the DNE can be used to navigate users away from adult content or inappropriate sites in order to implement parental controls with regards to web surfing. For example, sites may be categorized into age appropriate channels and parents can select which channels or sites the child can visit. All requests to sites not approved would be redirected. The redirection list in this case may be compiled based on a website content rating scheme, such as G, PG, R, X, and so on.

Another classification scheme is to redirect sites based on dangerous content, such as malware, virus, fraud, phishing, and so on. In this case, sites are analyzed with regard to content and known bad sites are placed on the redirection list. Any request to a known bad site would cause the DNE to issue a warning to the user and/or redirect the user to a known good site or information page.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of redirecting Internet traffic comprising:
defining a first list of domain names;
generating typographical variations of each domain name of the first list of domain names to define a second list of variable domain names for each domain name, wherein the typographical variations comprise at least one of: swapping characters within the domain name, dropping at least one character from the domain name, and adding at least one character to the domain name;
determining if each domain name of the second list of variable domain names is registered to generate a list of registered second list domain names;
classifying each domain name of the registered second list as either a legitimate site or an illegitimate site to generate a classified list of domain names;
comparing a domain name included in a user domain name service (DNS) request to the classified list of domain names to determine the alternate domain name to redirect to based upon information provided at the time of the user request, wherein the information is selected from the group consisting of: the unique user that is making the request, date and time of the request, location of the user making the request, user preference for the requested domain, and user preference for use of a service associated with the requested domain; and
substituting an alternate domain name if the domain name in the user request matches an illegitimate site on the classified list of domain names,
wherein the classifying, comparing and substituting steps are performed prior to transmission of an HTTP request corresponding to the alternate domain name.

2. The method of claim 1 wherein defining the first list of domain names comprises selecting a plurality of common domain names associated with known trademarks referenced over the Internet.

3. The method of claim 2 wherein generating variations of each domain name further comprises:
appending one or more relevant keywords to each domain name to create extended domain names for each domain name.

4. The method of claim 3 wherein a legitimate site is a site which is not to be redirected from, and an illegitimate site is a site that is to be redirected from.

5. The method of claim 4 wherein an illegitimate site comprises a site that abuses a trademark associated with at least one domain name of the first list.

6. The method of claim 5 wherein the illegitimate site is one of a typosquatting site, a phishing site, a malware site, a pay-per-click site, and an affiliate fraud site.

7. The method of claim 6 further comprising determining the alternate domain name to redirect to based upon information provided at the time of the user request, wherein the information is selected from the group consisting of: the unique user that is making the request, date and time of the request, location of the user making the request, user preference for the requested domain, and user preference for use of a service associated with the requested domain.

8. The method of claim 1 further comprising notifying the user that a redirection is occurring by displaying a message that is viewable within a web browser of a client computer operated by the user.

9. A system for redirecting Internet traffic, the system comprising:
a processor-based application executed on a computer and configured to:
define a first list of domain names;
generate typographical variations of each domain name of the first list of domain names to define a second list of variable domain names for each domain name, wherein the typographical variations comprise at least one of: swapping characters within the domain name, dropping at least one character from the domain name, and adding at least one character to the domain name;
determine if each domain name of the second list of variable domain names is registered to generate a list of registered second list domain names;
classify each domain name of the registered second list as either a legitimate site or an illegitimate site to generate a classified list of domain names;
compare a domain name included in a user DNS request to the classified list of domain names to determine the alternate domain name to redirect to based upon information provided at the time of the user request, wherein the information is selected from the group consisting of: the unique user that is making the request, date and time of the request, location of the user making the request, user preference for the requested domain, and user preference for use of a service associated with the requested domain; and
substitute an alternate domain name if the domain name in the user request matches an illegitimate site on the classified list of domain names wherein the steps executed by the processor-based application are performed prior to transmission of an HTTP request corresponding to the alternate domain name.

10. The system of claim 9 wherein the first list of domain names comprises a plurality of common domain names associated with known trademarks referenced over the Internet.

11. The system of claim 10, wherein the processor-based application is further configured to:
append one or more relevant keywords to each domain name to create extended domain names for each domain name.

12. The system of claim 9 wherein a legitimate site is a site which is not to be redirected from, and an illegitimate site is a site that is to be redirected from, and further wherein an illegitimate site comprises a site that abuses a trademark associated with at least one domain name of the first list.

13. The system of claim 12 wherein the illegitimate site is one of a typosquatting site, a phishing site, a malware site, a pay-per-click site, and an affiliate fraud site.

14. The system of claim 9, wherein the processor-based application is further configured to notify the user that a redirection is occurring by displaying a message that is viewable within a web browser of a client computer operated by the user.

15. A non-transitory machine-readable medium carrying one or more sequences of instructions for redirecting Internet traffic, which instructions, when executed by one or more processors, cause the one or more processors to carry out steps comprising:

defining a first list of domain names;

generating typographical variations of each domain name of the first list of domain names to define a second list of variable domain names for each domain name, wherein the typographical variations comprise at least one of: swapping characters within the domain name, dropping at least one character from the domain name, and adding at least one character to the domain name;

determining if each domain name of the second list of variable domain names is registered to generate a list of registered second list domain names;

classifying each domain name of the registered second list as either a legitimate site or an illegitimate site to generate a classified list of domain names;

comparing a domain name included in a user DNS request to the classified list of domain names to determine the alternate domain name to redirect to based upon information provided at the time of the user request, wherein the information is selected from the group consisting of: the unique user that is making the request, date and time of the request, location of the user making the request, user preference for the requested domain, and user preference for use of a service associated with the requested domain; and substituting an alternate domain name if the domain name in the user request matches an illegitimate site on the classified list of domain names, wherein the classifying, comparing and substituting steps are performed prior to a transmission of an HTTP request corresponding to the alternate domain name.

16. The medium of claim 15 wherein defining the first list of domain names comprises selecting a plurality of common domain names associated with known trademarks referenced over the Internet, and wherein generating variations of each domain name further comprises appending one or more relevant keywords to each domain name to create extended domain names for each domain name.

17. The medium of claim 16 further comprising instructions for notifying the user that a redirection is occurring by displaying a message that is viewable within a web browser of a client computer operated by the user.

* * * * *